Patented Sept. 14, 1926. 1,599,851

UNITED STATES PATENT OFFICE.

FRED D. TERRY, OF PASADENA, CALIFORNIA, ASSIGNOR, BY MESNE ASSIGNMENTS, TO MORGAN & COMPANY, OF HERMON, NEW YORK, A PARTNERSHIP CONSISTING OF ALBERT P. SY, OF BUFFALO, NEW YORK, AND NEIL E. MORGAN, OF HERMON, NEW YORK.

FLY EXTERMINATOR.

No Drawing. Application filed April 23, 1923. Serial No. 634,175.

My present invention is an insecticide, and a method of preparing and using the same, it being an especial object of this invention to mitigate the fly nuisance.

It is an object of this invention to provide a liquid adapted to be vaporized, within a room or elsewhere, in such manner as to produce a prompt effect in the killing of flies or other insects; and in a preferred form of my invention, I prepare and employ an extract of pyrethrum in a volatilizable organic liquid, such as gasoline.

It is a further object of this invention to provide a liquid which may be sprayed or evaporated into the air in such manner as to promptly destroy such insects as may breathe the same, although having no appreciably harmful or unpleasant effects upon higher forms of life, such as human beings; and I may associate with or incorporate in my volatile insecticidal liquid, containing an active principle adapted to kill such insects as may breathe the same, any desired perfume or deodorizing material, the choice of a deodorant or perfume being ordinarily dependent upon the place where my insecticide is to be used, it being within the scope of my invention to incorporate within my volitilizable liquid, when the same is to be used about a butcher shop, or the like, a material which shall impart thereto the odor of smoked meats—this being merely an example of the method by which I may adapt my composition to use in a particular location or environment.

It is believed that the general character of my invention may be fully understood from the following description of an illustrative embodiment thereof:

To prepare a gallon of my insecticidal liquid, I may admix one-half pound, more or less, of pyrethrum, preferably in a powdered form, with one gallon of a suitable solvent, such as coal oil, gasoline, or another mineral oil having the characteristic of being readily volatilized when sprayed in minute particles at ordinary temperatures and atmospheric pressures, and I may permit the resultant suspension to stand, ordinarily without an application of heat thereto, during forty-eight hours, more or less, and during this time the mixture may advantageously be stirred two or three times, or more frequently. At the end of the period referred to, the residues of pyrethrum having preferably been permitted to settle, I may draw off or otherwise separate the supernatant liquid therefrom, and this liquid is suitable for use, with or without the addition of a deodorant or perfume, for the destruction of flies or the like; and, for the purpose last referred to, cinnamon odor may be used when my insecticide is to be employed in bakeries, and violet odor may be used when the same is to be used in private residences.

To produce a prompt and reliable effect in the killing of flies, the insecticidal liquid referred to being easily volatilized, I may produce a vapor thereof in any suitable way, as by the use of an ordinary atomizer or spray pump, substantially equivalent results being also obtainable by a vaporization of the mentioned liquid in a suitable vessel or upon a surface.

The results obtained by the use of my insecticidal liquid are striking and advantageous in the highest degree, it being commonly possible, by the procedure above indicated, to practically eliminate flies from a butcher shop or the like, within a period of five minutes, the result sometimes being a visible accumulation of dead flies upon a floor. These results being obviously not dependent upon any entrance of poisonous material through the mouths of the insects destroyed, I attribute the immediate and surprising effects mentioned to the breathing of my insecticide by the flies or other insects which it destroys.

Applicant is aware of the use of pyrethrum as an insecticide and of the fact that it has been utilized in some cases in solution in water, in an emulsion with kerosene and also in certain proportions with alcohol. Such uses however, have been to spray plants or the like with the solutions, the object being to apply the pyrethrum as well as the conveying vehicles directly to the insects or to have same retained on the plant so that the insects will contact therewith.

Other methods of using pyrethrum have been in the form of powders, either pure or diluted with other powdered materials. The pyrethrum has also been burned for use in fumigation, either directly or by mixing with some combustible or more or less inert substance. However, these features are altogether different from applicant's invention, a characteristic feature of which is that the active principle of pyrethrum is held in solution or suspension in a mineral oil having such characteristics as would be readily volatilizable when sprayed in minute particles in the air at ordinary temperatures and atmospheric pressures; thus distributing the pyrethrum in volatilized form in the air.

Although I have indicated above the preferred composition of my insecticide, and preferred modes of preparing and using the same, it will be understood that various features of my invention might be independently employed, and that various modifications might be made therein without departure from the spirit and scope of my invention, as the same is indicated above and in the following claims.

What I claim is:

1. A liquid fly and insect repellent, comprising a clear homogeneous liquid consisting of kerosene and the volatile active principles of pyrethrum.

2. A liquid fly and insect repellent comprising a clear homogeneous mineral oil and the volatile active principles of pyrethrum, said oil being readily volatizable when sprayed in minute particles in the air at ordinary temperatures and atmospheric pressures.

3. In the preparation of an insecticide, the method which comprises extracting pyrethrum in a mineral oil solvent, in the proportions of about one half pound pyrethrum and one gallon of the solvent liquid, such solvent being readily volatilizable when sprayed in the air in minute particles at ordinary temperatures and atmospheric pressures.

In testimony whereof I have signed my name to this specification.

FRED. D. TERRY.

are altogether different from applicant's invention, a characteristic feature of which is that the active principle of pyrethrum is held in solution or suspension in a mineral oil having such characteristics as would be readily volatilizable when sprayed in minute particles in the air at ordinary temperatures and atmospheric pressures; thus distributing the pyrethrum in volatilized form in the air.

Although I have indicated above the preferred composition of my insecticide, and preferred modes of preparing and using the same, it will be understood that various features of my invention might be independently employed, and that various modifications might be made therein without departure from the spirit and scope of my invention, as the same is indicated above and in the following claims.

What I claim is:

1. A liquid fly and insect repellent, comprising a clear homogeneous liquid consisting of kerosene and the volatile active principles of pyrethrum.

2. A liquid fly and insect repellent comprising a clear homogeneous mineral oil and the volatile active principles of pyrethrum, said oil being readily volatizable when sprayed in minute particles in the air at ordinary temperatures and atmospheric pressures.

3. In the preparation of an insecticide, the method which comprises extracting pyrethrum in a mineral oil solvent, in the proportions of about one half pound pyrethrum and one gallon of the solvent liquid, such solvent being readily volatilizable when sprayed in the air in minute particles at ordinary temperatures and atmospheric pressures.

In testimony whereof I have signed my name to this specification.

FRED. D. TERRY.

Certificate of Correction.

It is hereby certified that Letters Patent No. 1,599,851, granted September 14, 1926, upon the application of Fred D. Terry, of Pasadena, California, for an improvement in "Fly Exterminators," were erroneously issued to "Morgan & Company, of Hermon, New York, a partnership consisting of Albert P. Sy, of Buffalo, New York, and Neil E. Morgan, of Hermon, New York," as owner of the entire interest in said invention, whereas said Letters Patent should have issued to the inventor, said *Terry*, and *Morgan & Company, of Hermon, New York, a partnership consisting of Albert P. Sy, of Buffalo, New York, and Neil E. Morgan, of Hermon, New York*, said company being assignee, by mesne assignments, of *one-half* interest only in said invention, as shown by the records of assignments in this office; and that the said Letters Patent should be read with this correction therein that the same may conform to the record of the case in the Patent Office.

Signed and sealed this 19th day of October, A. D. 1926.

[SEAL.] WM. A. KINNAN,
*Acting Commissioner of Patents.*

DISCLAIMER 1,599,851.—*Fred D. Terry*, Pasadena, Calif. FLY EXTERMINATORS. Patent dated September 14, 1926. Disclaimer filed October 14, 1929, by the patentee and assignee, *Terry Fly Spray Company*.

Hereby makes disclaimer of such interpretation of the words "mineral oil" in claim 2, and the words "mineral oil solvent" in claim 3 as would include gasoline.

[*Official Gazette November 5, 1929.*]

Certificate of Correction.

It is hereby certified that Letters Patent No. 1,599,851, granted September 14, 1926, upon the application of Fred D. Terry, of Pasadena, California, for an improvement in "Fly Exterminators," were erroneously issued to "Morgan & Company, of Hermon, New York, a partnership consisting of Albert P. Sy, of Buffalo, New York, and Neil E. Morgan, of Hermon, New York," as owner of the entire interest in said invention, whereas said Letters Patent should have issued to the inventor, said *Terry*, and *Morgan & Company, of Hermon, New York, a partnership consisting of Albert P. Sy, of Buffalo, New York, and Neil E. Morgan, of Hermon, New York*, said company being assignee, by mesne assignments, of *one-half* interest only in said invention, as shown by the records of assignments in this office; and that the said Letters Patent should be read with this correction therein that the same may conform to the record of the case in the Patent Office.

Signed and sealed this 19th day of October, A. D. 1926.

[SEAL.]

WM. A. KINNAN,
*Acting Commissioner of Patents.*

DISCLAIMER 1,599,851.—*Fred D. Terry*, Pasadena, Calif. FLY EXTERMINATORS. Patent dated September 14, 1926. Disclaimer filed October 14, 1929, by the patentee and assignee, *Terry Fly Spray Company*.

Hereby makes disclaimer of such interpretation of the words "mineral oil" in claim 2, and the words "mineral oil solvent" in claim 3 as would include gasoline.

[*Official Gazette November 5, 1929.*]